Dec. 1, 1925.  
H. COOCH  
METHOD OF MEASURING ELECTRICITY  
Filed April 17, 1925  
1,564,045
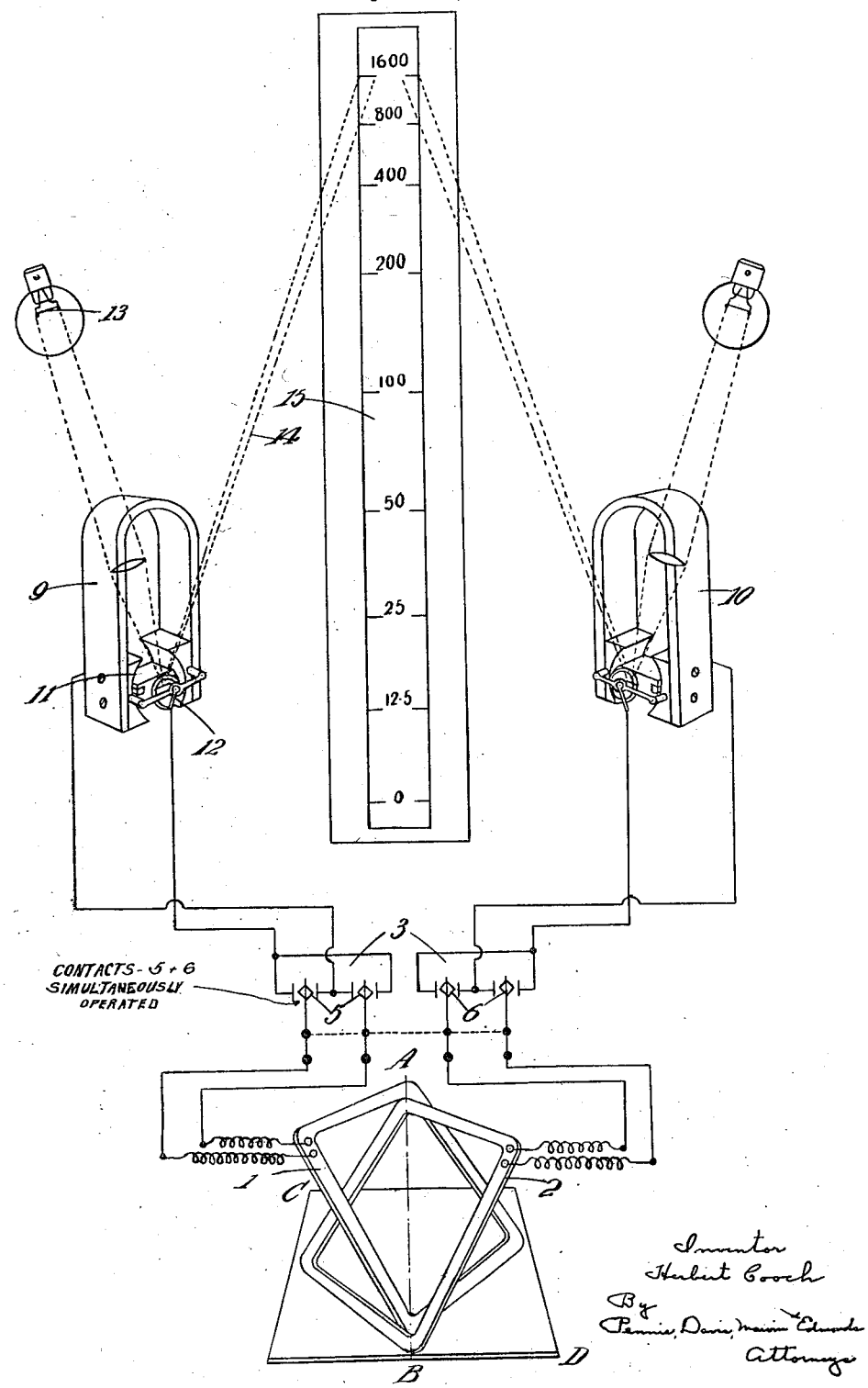

Patented Dec. 1, 1925.

1,564,045

UNITED STATES PATENT OFFICE.

HERBERT COOCH, OF SOUTH FARNBOROUGH, ENGLAND, ASSIGNOR TO VICKERS LIMITED, OF LONDON, ENGLAND.

METHOD OF MEASURING ELECTRICITY.

Application filed April 17, 1925. Serial No. 23,822.

*To all whom it may concern:*

Be it known that I, HERBERT COOCH, a subject of the King of Great Britain, residing at Royal Aircraft Establishment, South Farnborough, in the county of Hants, England, have invented certain new and useful Improvements in Methods of Measuring Electricity (for which I have filed application in Great Britain No. 27,736, Nov. 25, 1923), of which the following is a specification.

This invention relates to an improved method of measuring electricity and particularly for measuring small alternating electric current. The invention primarily is intended for use in measuring the strength of current or electromotive force induced in search coils or other conductors on a ship, airplane or other craft by a pulsating or alternating magnetic field determined by a leader cable or the like in the sea or on the ground in navigational systems to indicate direction, or distance from or height above the cable in bad visibility. The invention however is applicable for measuring alternating current or E. M. F. in other systems.

In such navigational systems, on the one hand, the E. M. F. induced in the search coils enclosing the pulsating or alternating magnetic field of any given strength can be increased proportionately by increasing the frequency of the magnetic field, but, on the other hand, whereas the amplitude of oscillation of a measuring device tuned to the same frequency as the applied E. M. F. is an indication of the strength of the E. M. F., the power required to give a definite amplitude of oscillation of a measuring device is greater in a device tuned to a higher frequency than in a device responding to a lower frequency.

According to the present invention, a small E. M. F. of higher frequency is measured by a device operating at a lower frequency after the higher frequency has been reduced to the lower frequency.

Further, according to the present invention in a navigational apparatus wherein a search coil or the like conductor has alternating current of a relatively high frequency induced in it by a pulsating or alternating magnetic field, a measuring device operating at a relatively low frequency is used and a frequency reducer is interposed between the search coil and the measuring device to reduce the higher frequency to the lower frequency.

The invention also comprises the association of a device operating at a lower frequency for measuring a small E. M. F. of higher frequency after reduction to the lower frequency with a device for reducing the higher frequency E. M. F. to the lower frequency E. M. F. consisting of a vibrating reed, tuning fork, clockwork or other periodic electric contact apparatus having a natural frequency equal to the sum of or the difference between said frequencies.

The invention further comprises for the purpose of measuring the strength of an E. M. F. which has had its frequency reduced, the use of a measuring device, such as a mirror and a tangent scale, in which larger linear height or other indications are obtained per unit angular movement of the mirror at the zero end of the scale, and smaller linear height or other indications are obtained per unit angular movement of the mirror at the maximum end of the scale.

In carrying out the present invention use is made of navigational apparatus constituted by the combination with frequency reducing and measuring apparatus as aforesaid of two search coils or sets of search coils symmetrically disposed about a fore-and-aft vertical plane and inclined to the horizontal plane and to each other. In such an arrangement, two scales may be associated side by side or in other convenient arrangement to enable the relative strengths of the alternating current or E. M. F.'s induced in the search coils and the relative phase or polarity of the currents or E. M. F.'s in the search coils to be observed.

The invention is not limited to any particular frequencies of E. M. F. to be measured or any particular frequency applied to the measuring device, but in a navigational system of the nature referred to the frequency of the E. M. F. in the search coils may be of the order of say 25 to 100 cycles per second, and the frequency applied to the measuring device may be of the order of say 2 cycles per second.

In carrying out the invention, the frequency reducer may be connected in series between the search coil or other circuit carrying the E. M. F. to be measured and the measuring apparatus.

The frequency reducer may be of any suitable type such for example as clockwork, vibrating reed, tuning fork or any apparatus which will close and open an electric contact periodically at any predetermined sequence. Where the frequency reducer is of the type which closes the circuit intermittently between the source of E. M. F. to be measured and the measuring device, the frequency of the contact on the reducer is tuned to be equal to the frequency of the phenomenon to be measured plus or minus the natural frequency of the measuring device. The frequency of the current supplied to the measuring device is thus equal to the difference between the frequency of the E. M. F. to be measured and the frequency of the reducer contact.

Condensers may be connected on each or one side of the frequency reducer in parallel with either the measuring device or the source of the E. M. F. to be measured or with both to assist by their discharge action the supply of E. M. F. to the measuring device. The capacity of the condensers may be such that the search coil and one condenser, and the measuring instrument and the other condenser form two electric oscillatory circuits which are connected together intermittently by the frequency reducer.

The measuring device may be of any type of apparatus for indicating strength of current or E. M. F. provided it has a suitably low natural period of oscillation. It may be a centre zero direct current indicator which operates at a predetermined current or E. M. F.

In applying the invention to a navigational system such as indicated above comprising two separate inclined search coils are arranged at a angle to one another and acted on by the pulsating or alternating magnetic field from a sea or ground cable. By utilizing higher frequencies in the sea or ground cable to give a higher induced E. M. F. in the search coils, the weight of the search coils carried by the aircraft as well as the current in the sea or ground cable can be reduced.

The application of the present invention enables the control relay and indicating means hitherto employed to be replaced by a low frequency direct reading device giving indications of the strength of the E. M. F. induced in the search coils. In this case the indicating instrument, for example, may consist of a pair of coils moving in strong unidirectional magnetic fields similar to the well known methods adopted for voltmeters but preferably wound on non-conducting forms to reduce the damping effect. The measuring device can be tuned to a low natural period of oscillation so that an appreciable amplitude of swing results when very small alternating currents of the same frequency are applied. The amplitude of swing can be calibrated to indicate the E. M. F. applied.

The amplitude of swing of the measuring device may be indicated by suitable pointers attached to the moving coils or other moving part and moving over scales in the well known manner, or the amplitude of swing or angular movement of the coils or other moving part may be indicated by mounting a mirror on each moving coil and recording the angular movements by spots of light reflected from the mirrors on to a suitable scale.

The density of the magnetic field varies approximately inversely as the distance from the ground cable and it is an advantage to have larger indications per unit E. M. F. induced in the search coils when in a weak field or at some distance from the cable than when the search coils are in a stronger field near the ground cable.

In the method of recording the angular movement of the measuring coils by spots of light reflected from mirrors on to a scale, the larger linear movement of the spot of light on the scale per unit E. M. F. at the minimum reading end of the scale and the small linear movement per unit E. M. F. at the maximum end of the scale may be obtained by arranging the scale in a plane which lies tangentially to the path of the moving coil. The natural frequency of swing of the moving coils is kept low so that only low powers are required to give an angular movement. The most suitable frequency is probably one where the speed of movement of the spot of light or pointer movement is fast enough to give an optical illusion of a quantitative streak and also enough to distinguish a 180° difference in phase or direction of movement when two such indications are given side by side. By distinguishing this 180° difference in phase, indications are obtained of the relative polarity of the search coils in the alternating magnetic field.

In order to illustrate the invention more clearly its operation will be described with reference to the accompanying diagrammatic drawings as applied to the measurement of small alternating currents or E. M. F.'s in navigational apparatus where search coils are carried by an aircraft and in which coils E. M. F.'s are induced due to an alternating or pulsating magnetic field produced by currents in a ground cable in the manner above indicated.

In the construction of apparatus shown, two search coils 1, 2 are carried by the aircraft being symmetrically disposed about a fore-and-aft vertical plane AB and inclined to the horizontal plane CD and to each other: by simultaneously recording E. M. F.'s induced in the coils steering directions to follow a definite path and the height of the craft above the ground are indicated. Although the coils 1 and 2 are shown as interlinked this is not essential and they may be separated by any desired distance. When the E. M. F.'s induced in the two search coils are unequal as indicated on the instrument the aircraft is not on its definite course and a steering direction is obtained to enable the aircraft to get on to the course and when the E. M. F.'s are equal the pilot has indication that he is on his correct course and his height above the ground is simultaneously indicated.

The numeral 3 indicates a frequency reducer consisting of four double pole reversing contacts 5, 6, two of which are connected to the coil 1 and two of which are connected to the coil 2. The contacts 5, 6 are coupled or otherwise arranged so that they are operated simultaneously by a vibrating reed, tuning fork, clockwork or other apparatus having a constant predetermined frequency. The current from the coil 1 passes through the frequency reducer 3 to a measuring instrument 9, and the current from the coil 2 passes through the frequency reducer 3 to a measuring instrument 10.

The two halves of the apparatus shown are similar and it will therefore suffice if one half is described in detail.

The frequency of the E. M. F. or current induced in the search coil 1 may be, for example, 33 periods per second. The frequency of the oscillating contacts 5 may be, for example, 35 or 31 periods per second.

The measuring instrument 9 consists of a coil 11 moving in a uni-directional magnetic field in a similar manner to the well known arrangement adopted in voltmeters. The voltmeter movement used is of the usual centre zero type with a mirror 12 attached to the spindle in the position usually occupied by the pointer.

The movement of the coil 11 operates against the action of springs in the well known manner of moving coil instruments, but in the present case the spring and the coil are adjusted to have a definite predetermined natural period of oscillation. This period of oscillation in the present case is 2 periods per second or the difference between the frequency of the current induced in the search coil 1 and the frequency of the moving contacts of the frequency reducer 3.

A projector 13 causes a beam of light 14 to be reflected from the mirror 12 on to a scale 15 as shown so as to cause a spot or line of light to appear on the left hand side of the graduated scale 15 in a position depending on the angular position of the mirror. The scale is arranged tangentially to the path of the moving coil and the projector is arranged so that the spot of light is at the top end of the scale when the coil is stationary or in its zero position.

It will be appreciated that as the moving coil oscillates about its stationary or zero position the spot of light oscillates up and down the scale, but as when the coil is in its stationary or zero position, the spot of light is at the top or one end of the scale, only one half of the oscillation of the spot of light is visible on the scale. The distance travelled by the spot of light down the scale indicates the amplitude of oscillation of the moving coil. The scale is set tangentially to the path of the moving coil as shown in the drawing so that a large linear movement per unit angular coil movement is obtained at the top end of the scale and a smaller linear movement per unit angular coil movement is obtained at the bottom end of the scale.

The scale is graduated as shown to indicate height above the ground cable and as the E. M. F. induced in the coil is minimum at maximum height and maximum at minimum height, the greatest height recorded will be at the top end of the scale or in the position where there is minimum movement on the moving coil.

If the alternating E. M. F. at 33 periods per second from the search coil 1 is passed through the double pole reversing contacts 5 of the frequency reducer 3 which oscillates at a frequency of 31 periods per second, the resultant E. M. F. applied to the measuring instrument 9 has an average value which oscillates at the rate of 2 periods per second. The moving coil of the measuring instrument 9 therefore receives electrical impulses at a rate equivalent to its own natural frequency of oscillation and the amplitude of oscillation is an indication of the strength of the E. M. F. induced in the search coil. It will also be appreciated that the average current applied to the measuring instrument 9 is in one direction when the contacts of the frequency reducer reverse most of the negative portion of the alternating curve of the current received from the search coil, and the average current in the instrument is reversed when the frequency reducer reverses most of the positive portion of the alternating curve of the current received from the search coil.

If now we examine the operation of the complete apparatus shown in the drawing it will be seen that the E. M. F. induced in the search coil 1 at a frequency of 33 periods per second causes a spot of light to oscillate on the left hand side of the graduated scale at the rate of 2 periods per second, the amplitude of its oscillation being governed by the amount of E. M. F. induced in the search coil 1. Similarly the E. M. F. induced in the search coil 2 causes a second spot of light to oscillate on the right hand side of the graduated scale at an amplitude governed by the amount of E. M. F. induced in the search coil 2. The two pairs of reversing contacts of the frequency reducer 3 operate simultaneously and the connections are arranged so that the two spots of light are in synchronism when the two search coils are arranged so that at any instant the magnetic field passes through one coil from the under side and through the second coil from the top side. If for example the search coils are placed in a magnetic field which is horizontal and in the same plane as the paper of the drawing, the magnetic field enters from the underside of the coil 2 and the top side of the coil 1 at any instant. If however, the search coils are placed in a magnetic field which is horizontal but in a plane at right angles to the paper, it enters from the top side of both coils at any instant, and the induced currents in the two coils have a relative polarity 180° different from the case where the magnetic field enters from the top side of one coil and the underside of the second coil. It will be seen that the spots of light from the two instruments will oscillate in synchronism in one case but will oscillate at the same frequency but out of synchronism by 180° apart in the other case.

The instrument is therefore capable of giving simultaneously the value of E. M. F. induced in each search coil and also the relative polarity of the two search coils one to the other, which are of advantage and of great value in navigational apparatus of this type.

What I claim and desire to secure by Letters Patent of the United States is:—

1. A method of measuring distance by electrical means, which comprises inducing a current in each of two coils normally positioned symmetrically with relation to the direction of the inducing field, applying the current so obtained to frequency reducers, operating the frequency reducers at such rate as to obtain currents of low frequency, and applying the resultant currents to a measuring means thereby indicating the relative E. M. F.'s induced in each coil.

2. A method of measuring distance by electrical means which comprises, providing two coils symmetrically positioned, inducing a current in each of the said coils by means of a field to obtain a current of variable E. M. F. in each of the coils corresponding to the area of such coil presented to the field, applying the resultant currents to frequency reducers, operating the frequency reducers at such a rate as to obtain currents of low frequency, and applying the currents so obtained to measuring means to indicate relative variation in the currents induced in each coil.

HERBERT COOCH.